(12) United States Patent
Keeler et al.

(10) Patent No.: US 6,880,839 B2
(45) Date of Patent: Apr. 19, 2005

(54) IN-LINE LIFT AXLE SUSPENSION SYSTEM (75) Inventors: Michael J. Keeler, Blacklick, OH (US); Michael J. Gottschalk, Granville, OH (US)

(73) Assignee: Boler Company, Itasca, IL (US)

( * ) Notice: Subject to any disclaimer, the term of this patent is extended or adjusted under 35 U.S.C. 154(b) by 217 days.

(21) Appl. No.: 10/384,755

(22) Filed: Mar. 11, 2003

(65) Prior Publication Data

US 2004/0178594 A1 Sep. 16, 2004

(51) Int. Cl.[7] .............................................. B60G 11/26
(52) U.S. Cl. ............................... 280/86.5; 280/86.751; 280/124.153
(58) Field of Search .................... 280/86.5, 86.751, 280/124.11, 124.128, 124.153

(56) References Cited

U.S. PATENT DOCUMENTS

| | | | |
|---|---|---|---|
| 3,510,149 A | 5/1970 | Raidel | |
| 3,771,812 A | 11/1973 | Pierce et al. | |
| 3,861,708 A | 1/1975 | Fier | |
| 3,902,734 A | 9/1975 | Fier | |
| 3,904,220 A | 9/1975 | Fier | |
| 4,770,430 A | 9/1988 | Lange | |
| 4,792,148 A | 12/1988 | Hintz | |
| 4,881,747 A | 11/1989 | Raidel | |
| 5,015,004 A | 5/1991 | Mitchell | |
| 5,018,756 A | 5/1991 | Mitchell | |
| 5,058,916 A | 10/1991 | Hicks | |
| 5,220,972 A | 6/1993 | Proia | |
| 5,403,031 A | * 4/1995 | Gottschalk et al. | 280/86.5 |
| 5,479,999 A | 1/1996 | Proia | |
| 5,620,194 A | 4/1997 | Keeler et al. | |
| 5,816,605 A | 10/1998 | Raidel, Sr. | |
| 6,007,078 A | * 12/1999 | Gottschalk et al. | 280/86.751 |
| 6,073,946 A | * 6/2000 | Richardson | 280/86.5 |
| 6,182,984 B1 | 2/2001 | Chalin | |
| 6,293,570 B1 | * 9/2001 | Gottschalk et al. | 280/86.751 |
| 6,311,993 B1 | * 11/2001 | Hulstein et al. | 280/86.5 |
| 6,416,069 B1 | * 7/2002 | Ramsey | 280/124.116 |
| 6,471,223 B1 | * 10/2002 | Richardson | 280/86.5 |
| 6,619,673 B1 | * 9/2003 | Eckelberry et al. | 280/6.151 |
| 6,669,303 B1 | * 12/2003 | Dodd | 298/17 B |

* cited by examiner

Primary Examiner—Paul N. Dickson
Assistant Examiner—Toan C To
(74) Attorney, Agent, or Firm—Hall, Myers, Vande Sande and Pequignot (57) ABSTRACT A parallelogram lift axle suspension system includes an in-line lift bellows located between and vertically aligned with a pair of upper and lower control arms so as to provide bi-directional expansion and contraction of the lift bellows for raising and lowering the suspension while increasing the space available between the longitudinal frame rails enabling use of the suspension in certain vehicles by avoiding interference with other vehicle components of the vehicle located in this space.

12 Claims, 6 Drawing Sheets

IN-LINE LIFT AXLE SUSPENSION SYSTEM

This invention relates to auxiliary lift axle suspension systems for wheeled vehicles such as heavy duty dump trucks and trailers. More particularly, this invention relates to auxiliary lift axle suspension systems having an improved mechanism for selectively lowering and lifting the wheel bearing auxiliary axle of a vehicle into and out of road engagement.

BACKGROUND OF THE INVENTION

The need for certain vehicles such as heavy duty dump trucks, semi-trailers and the like, to have at least one (and often more than one) designated wheel bearing axle suspension system(s) capable of being raised and lowered selectively into and out of load bearing engagement with the road surface, is well-known in the art. This need usually arises in order that the vehicle be capable of legally satisfying maximum highway weight limit laws, as well as to provide an additional measure of safety when the vehicle is loaded. In this respect, such maximum weight limit laws often mandate, not just a maximum vehicle weight, but further prescribe (e.g., as by the so-called "bridge formula") that the required number of axles needed be spaced in such a manner so as to distribute the weight of the vehicle and its cargo over a selected length of the vehicle. Such extra axles and their attached suspension systems are often referred to as "auxiliary" axle suspension systems.

The ability to lawfully carry the maximum weight of the load (cargo) allowed by law often translates economically into maximized profit and a more economically efficient use of the vehicle. However, it is also known that when the vehicle has one or more auxiliary axles added to its standard front and rear axles, three basic drawbacks arise when the wheels of the auxiliary axle(s) are in road engagement. The first is that cornering can become difficult. The second is that fuel efficiency can be reduced. The third is that tire wear can increase.

To overcome these drawbacks, the truck/trailer suspension art over the years has designed and developed numerous auxiliary axle suspension systems which are provided with a mechanism which when activated, usually from the cab of the truck or trailer, enables the wheels to be selectively raised out of or lowered into load bearing engagement with the road surface, thus, mitigating (reducing) the above-described problems associated with auxiliary axle usage. Moreover, in those systems which are properly designed, when lowered into road engagement the suspension assumes its proper, safe and lawful share of the load. When not needed (e.g., when the truck is empty) properly designed suspensions can be activated to raise the wheels off the road surface a sufficient distance and maintain them at this distance from the road thereby preventing inadvertent road contact, even when experiencing a curb or road bed irregularity. In this way, the system provides prolonged tire life and less fuel usage while making cornering easier, because these "auxiliary" wheels can be lifted when cornering, or when otherwise not needed.

While numerous types of auxiliary lift axle suspension systems have been devised, only a relatively few have been recognized as safe and effective for their intended purpose, and/or found over the years to be truly commercially acceptable. In this respect, the truly effective, safe and commercially acceptable designs are generally recognized as falling into three basic lift axle suspension system configurations. They are: (1) the use of an inverted leaf spring as both the lift mechanism and as a longitudinal tracking beam, accompanied by an air bellows, deflated at lift position but when inflated against the leaf spring's upward bias, lowers the suspension into road engagement thereby achieving a full load bearing, air-ride characteristic (e.g., as disclosed in U.S. Pat. No. 3,285,621); (2) the use of a longitudinal, heavy, tracking beam and an opposing air-bellows arrangement at either end of the beam (as first pioneered in commercially successful form by Neway Corporation and later adopted by others); and (3) the use of various types of lift mechanisms in combination with a highly stable, weight reducing, parallelogram suspension configuration. Perhaps one of the most successful of this type of lift suspension is those embodiments disclosed in U.S. Pat. No. 5,403,031 and commercially known as the Paralift™ and Paralift Ultra™ systems of Hendrickson Corporation).

Each of these three basic designs has its own distinctive features, making it the choice of design among certain vehicle operators. Currently, however, most knowledgeable heavy duty truck and trailer operators recognize that for many commercial operations the characteristics resulting from the "parallelogram" type lift suspension give rise to the best performance, as compared to the other two types described above. For example, the parallelogram design is lighter in weight than the heavy duty beam type suspension, yet its parallel or at least substantially parallel (from a side view perspective) control arms located in approximately the same vertical plane, achieve a high degree of wheel "tracking" necessary for safety and acceptable tire life. Moreover, while parallelogram suspensions are generally heavier in weight than the automatic leaf spring lift-suspensions, the parallelogram design allows, in most instances, for much heavier loads to be safely carried, while achieving at least equal "tracking" as the leaf spring lift design. Still further, the parallelogram design usually allows the suspension to have a shorter overall design length than either of the two other designs, enabling it to be placed on certain vehicles where the leaf spring lift and/or beam type lift suspension will not fit.

While the parallelogram type suspension is currently a rather popular design of choice due to its advantageous features as set forth above, when adopted to become a "lift" suspension, difficulties have historically been experienced in devising an acceptable lift mechanism that is able to efficiently and reliably, over an acceptable useful life, perform its intended task (lifting and lowering the wheels effectively, safely and lawfully). Thus, a need arose in the art for a lift axle suspension system of the parallelogram type, for both steerable and non-steerable suspensions, which had a truly effective lift mechanism that can achieve the basic characteristics of: lawful operation, effective lift, efficient lowering, safe and effective suspension operation when in road engagement, and long life of the various parts, including the lift mechanism.

This need was largely met, with high commercial success, by the aforesaid unique, parallelogram-type lift axle suspension systems as disclosed in the aforesaid U.S. Pat. No. 5,403,031 (with or without its unique axle caster adjusting feature). Moreover, in certain of the embodiments disclosed in this '031 patent, another problem attendant various former lift suspensions known as the "accordion effect," (which tended to shorten the life of the lift bellows), was overcome without the, heretofore thought necessary, use of heavy, weight-adding, pivot bracketry.

The '031 patent's design achieved its improved results in this respect through the use of a structure which enabled the lift bellows to expand and contract bi-directionally in a highly efficient manner, while achieving at the same time, as a true parallelogram-type suspension, the known advantage of this type of suspension. In addition, weight was reduced over the known heavy beam type suspensions and life expectancy of the lift bellows was increased due to the elimination of the "accordion effect" (a term used herein according to the meaning of that term given to it in the aforesaid '031 patent). Efficient lifting was also achieved in the embodiments of the invention disclosed in the '031 patent, while at the same time, the ability to carry more load in a lesser confined space than the known leaf spring lift design resulted. For the first known time then, the '031 patent disclosed a truly effective parallelogram type lift axle suspension system.

Figure 1:
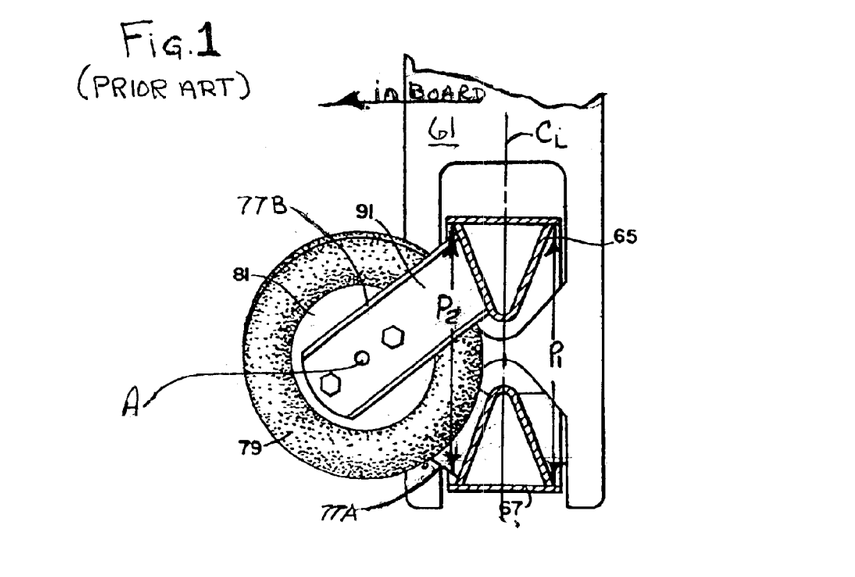
FIG. 1 (PRIOR ART) is an end plan, partially sectionalized view of an embodiment of the invention in U.S. Pat. No. 5,403,031.

While advantageous, as well as being safe and effective for their intended purpose, the specific embodiments set forth in this '031 patent (as commercially exemplified, as aforesaid, by the Hendrickson Paralift™ and Paralift Ultra™ steerable and non-steerable lift axle suspension systems) were in need of further inventive improvement in order to meet certain particularly specialized applications in the vehicle art. For example, as illustrated in the figures of this '031 patent and with particular reference to the location of the lift bellows as shown in FIG. 4 thereof, reproduced here as. FIG. 1 (PRIOR ART), frame hanger bracket 61 is pivotally attached to the first ends of upper control arm 65 and lower control arm 67. From each of these control arms there then extends in the inboard direction, as shown by the arrow labeled accordingly, a pair of opposing appendages 77A, 77B between which the lift air bellows 79 is operatively located. When operated, the air bellows 79 expands and contracts in a "bi-directional" manner, advantageous to the life expectancy of the bellows.

As in the case of the '031 patent, so here, the term "bi-directional" expansion and contraction may be defined in two synonymous ways. The first definition is in terms of the direction of expansion. The second definition is in terms of the angular relationship of the opposing end plates at opposite ends of the lift bellows during expansion and/or contraction. Pursuant to the first definition, the term "bi-directional," may be said to mean that the lift bellows expands (and/or contracts) in two linearly substantially opposite directions, thus, dividing the lifting (and lowering) forces of the bellows (but not necessarily equally) between the upper and lower control arms. A second and synonymous manner of defining the term "bi-directional," as is demonstrated by the operation of the '031 patent suspension as well as the suspensions of the preferred embodiments of this invention as described below, is with reference to the angular relationship between the two end plates of the lift bellows "bi-directional" is here defined in this second definition as the angular relationship between the two opposing end plates remaining substantially the same throughout expansion and contraction.

With reference, in this respect, to FIG. 1 (PRIOR ART) and the drawings of the '031 patent, this latter definition of "bi-directional" refers to the angular relationship between end plates 81 (FIG. 1) and 83. (End plates 83 are not shown in FIG. 1, but are shown in other drawings of the '031 patent). A principal purpose of this bi-directional feature is to avoid the detrimental life-shortening effect on the lift bellows as well as efficiency problems caused by the "accordion effect" as more fully described and illustrated in the '031 patent.

While the most preferred way of overcoming this "accordion effect" is to insure no change at all in the angular relationship between a lift bellows' two opposing end plates, some angular change is at times acceptable. Generally speaking, however, to be "bi-directional" as used herein, the angular relationship should not vary by more than about 8°, preferably less than about 3° and most preferably less than about 1° (i.e., 1° being essentially zero except for minor changes caused, for example, by the resiliency of the bushings in the pivot connections at the ends of the control arms). Moreover, and in this respect, it is to be understood that "bi-directional" expansion and contraction does not require that the relationship between the two opposing end plates of a lift bellows be parallel (although this is the preferred embodiment). Instead of parallel, the end plates may be offset at an angle from each other up to a few degrees from parallel (e.g., 2–10°), the important feature being that to be "bi-directional," whatever the angular relationship is, offset or parallel, this angular relationship should remain substantially the same throughout expansion and contract of the lift bellows during operation of the suspension. By achieving this "bi-directional" mode of expansion/contraction a better efficiency of the lift operation and reduced wear on the rubber portion of the bellows is achieved.

The lift suspensions embodying the '031 patent have as aforesaid proven to be highly commercially successful and safe for their intended purpose. However, in practice, and with reference again to FIG. 1 (PRIOR ART), it has now been found that the embodiments described and illustrated in the '031 patent [as represented here by FIG. 1 (PRIOR ART)] are not truly usable on certain vehicles which otherwise could advantageously employ such a lift suspension. This is particularly true for certain vehicles when the auxiliary lift axle suspension is to be placed in the so-called "pusher" position, i.e., forward of the rear drive axle (and, of course, rearward of the front axle). This is because in certain vehicles there exists various componentry which limits the space between the longitudinal frames of the vehicle that would otherwise be used to accommodate portions of the lift suspension. As will be noted from FIG. 1 (PRIOR ART) in the embodiments disclosed in the '031 patent, lift bellows 79 is offset a substantial distance in the inboard direction from the center line $C_L$ of upper control arm 65 and lower control arm 67. Stated another way, the longitudinal control axis $A_L$ of lift bellows 79 is inset in the inboard direction (see arrow) a significant distance from under the outside longitudinal frame member 63 of the vehicle so as to be outside the two planes $P_1$ and $P_2$ defined by opposing preferable edges of control arms 65 and 76. If, then, there exists componentry such as a drive shaft, PTO, hydraulic pump, etc., at this location where bellows 79 must reside, the highly advantageous bi-directional, parallelogram lift suspensions of the '031 patent heretofore could not be used.

In view of the above and despite the highly advantageous nature of the invention in the '031 patent, there, thus, arose a need in the art for a new lift axle suspension system which captures the benefits of the suspension of the '031 patent, but which avoids the limiting configuration problem as described above.

It is a purpose of this invention to fulfill this and other needs in the art which will become more apparent to the skilled artisan once given the following disclosure.

SUMMARY OF THE INVENTION

Generally speaking, this invention fulfills the above needs in the art by providing a lift axle suspension system comprising:

a) an upper and a lower control arm, each arm having a first end and a second end;

b) a frame bracket member located at the first end of each control arm;

c) pivot means connecting the first ends of the control arms to a respective frame bracket member;

d) an axle connecting member for connecting an axle to the suspension;

e) pivot means connecting the second ends of the control arms to the axle connecting member;

f) each upper and lower control arm having an inboard edge and an outboard edge thereby defining between said respective edges of said upper and lower control arms an inboard plane and an outboard plane and a space between said inboard plane and said outboard plane; and g) an expandable and retractable lift bellows having a first end connected to one of said control arms, a second end connected to the other of said control arms and having a longitudinal central axis located within said space between the inboard plane and the outboard plane (defined as aforesaid by the edges of the control arms to which the bellows is connected).

In certain preferred embodiments of this invention, the suspension is a parallelogram-type suspension. In still further preferred embodiments of this invention, the control arms in a given pair are substantially parallel to each other in either, and preferably both, the horizontal and vertical directions. In such preferred embodiments, moreover, with each lift bellows located between the upper and lower control arms in a given pair, it is still a more preferred embodiment to locate the lift bellows such that its longitudinal central axis is in the plane as defined by the longitudinal axis [e.g., center line $C_L$ in FIG. 1 (PRIOR ART)] of the upper and lower control arms between which the lift bellows is located, or at least so proximal to that plane, that the offset is essentially zero within the normal limits of acceptable manufacturing tolerances.

This invention will now be described with respect to certain embodiments thereof as illustrated in the following drawings, wherein:

DETAILED DESCRIPTION OF THE INVENTION

FIG. 1 (PRIOR ART), its description and the reference to the remainder of the drawings and embodiments in U.S. Pat. No. 5,403,031 are discussed given above and have been presented to demonstrate the improvements of the invention set forth herein. As will become more apparent from the following disclosure given below, the invention herein provides the art with improved configurations for lift axle suspensions which enable them to be used in a wider variety of vehicles, than were available for the disclosed embodiments of the '031 patent, while at the same time achieving all of the benefits of the highly advantageous suspensions of this '031 patent.

Figure 2A:
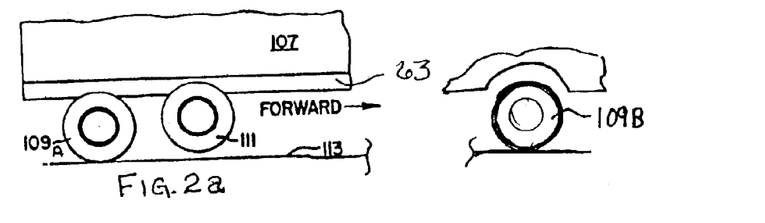
FIGS. 2a and 2b are partial side views of a typical vehicle having mounted thereon in the "pusher" position, a lift suspension with wheels (including tires) according to this invention (in the raised and lowered positions, respectively).
Figure 2B:
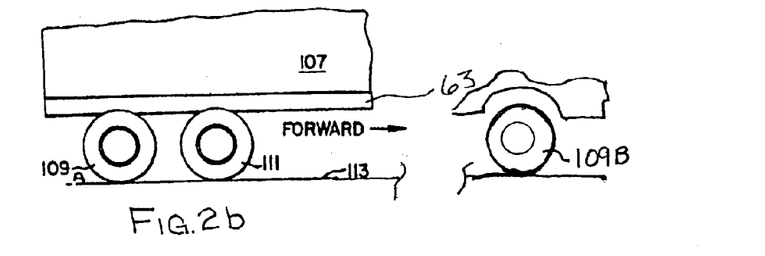

FIGS. 2a and 2b are presented simply to illustrate a typical vehicle, such as a heavy duty dump truck or dump trailer, or other type of vehicle whose commercial use gives rise to the need for or the desirability of having, if physically possible given its other componentry, an auxiliary lift suspension system and, thus, on which the suspensions of this invention may be advantageously employed even where other lift suspensions would not fit.

As illustrated in FIGS. 2a and 2b, the vehicle has at least two primary road-engaging, wheel-bearing, suspensions 109A and 109B, which provide permanent road support for the vehicle. Suspension 109B, for example, may be the forward (front) steerable axle. Suspension 109A may then be the rearward-most axle, steerable or non-steerable. Each of these suspensions may be of conventional design. For example, suspension 109A may be the "drive" axle of the vehicle. Suspension 109A is typically attached to the longitudinal frame rails 63 of the vehicle which are, of course, located on both the right and left sides of the vehicle. In each permanent suspension, an axle of a known conventional design is connected to the suspension and normally extends across (and underneath) the vehicle's body to connect the duplicated suspensions attached to their respective right and left side frame rails.

Lift axle suspension (with tires and wheels) 111 is similarly attached to each left and right side longitudinal frame rail 63 and has, like suspension 109A, an axle extending therebetween. However, lift axle suspension 111 also has associated with it a mechanism for lifting the wheels out of engagement with road surface 113 (as shown in FIG. 2a) or lowering the wheels into lawful weight bearing, road engagement with road surface 113 (as shown in FIG. 2b).

In FIGS. 2a, b the lift suspension is shown in an intermediate position on frame rail 113 between primary support suspensions 109A and 109B. If suspension 109A is a drive axle suspension, then lift suspension 111 is characteristically referred to as a "pusher" axle suspension or as being in the "pusher" position. If, as is known in the art, the position of drive axle suspension 109A and lift axle suspension 111 are reversed, then lift axle suspension 111 is characteristically referred to as a "tag" axle suspension or as being in the "tag" position.

The lift axle suspensions of this invention are useful in all known positions for lift axles, including the aforesaid "tag" and "pusher" positions. Moreover, because of their unique "in line" structure, not only do they achieve the significant improvements that were provided to the art by the invention disclosed in U.S. Pat. No. 5,403,031, but they are useful in a number of vehicle configurations which, due to other necessary or desirable but obstructing componentry on the vehicle could not accommodate the embodiments described in the aforesaid '031 patent and many other known lift axle suspension systems. This improved space accommodating feature of this invention over the prior art is now demonstrated by the following description of the preferred embodiments of this invention as shown in FIGS. 3–7, which also achieve all of the beneficial characteristics of the highly advantageous suspensions of the '031 patent.

With reference first to FIGS. 3–6, a preferred embodiment of this invention is illustrated. As illustrated, lift axle suspension 1 is typically attached (as by bolting) to a frame component (e.g., longitudinal frame member 63, FIGS. 5–6) of the vehicle. This typically is done by attaching each side of the suspension to its respective longitudinal frame rail (63 in FIGS. 5–6) of the vehicle, one on the right side of the vehicle, the other on its left side. This attachment is accomplished by hanger bracket 5 located at the forward end of suspension 1 (see the arrow "forward" referring to the forward direction of vehicle travel) and by upper end plate 9a of ride bellows 7 located at the opposite and, thus, rearward end of suspension 1.

Figure 3:
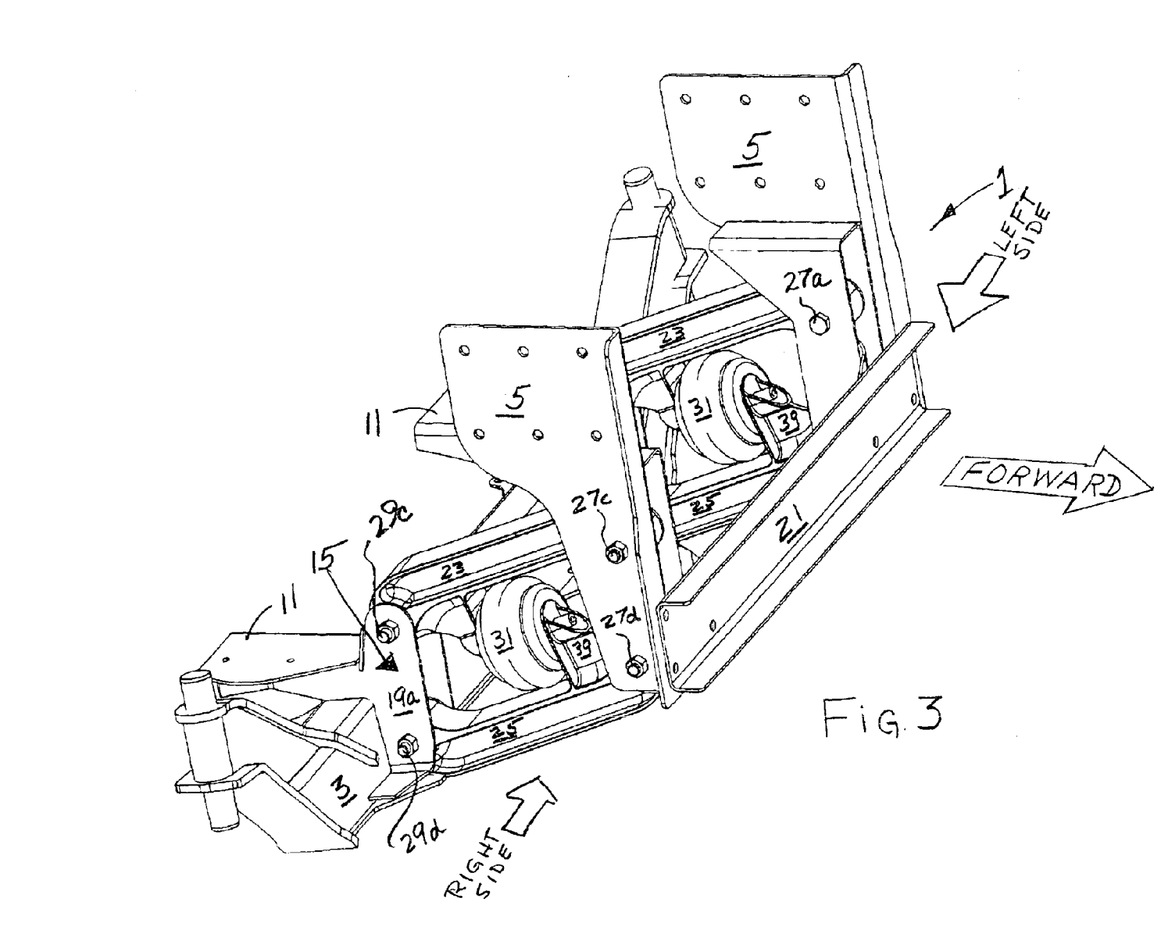
FIG. 3 is a three dimensional, right side (when mounted on a vehicle) rearward looking view of an embodiment of this invention, without the ride bellows installed.
Figure 4:
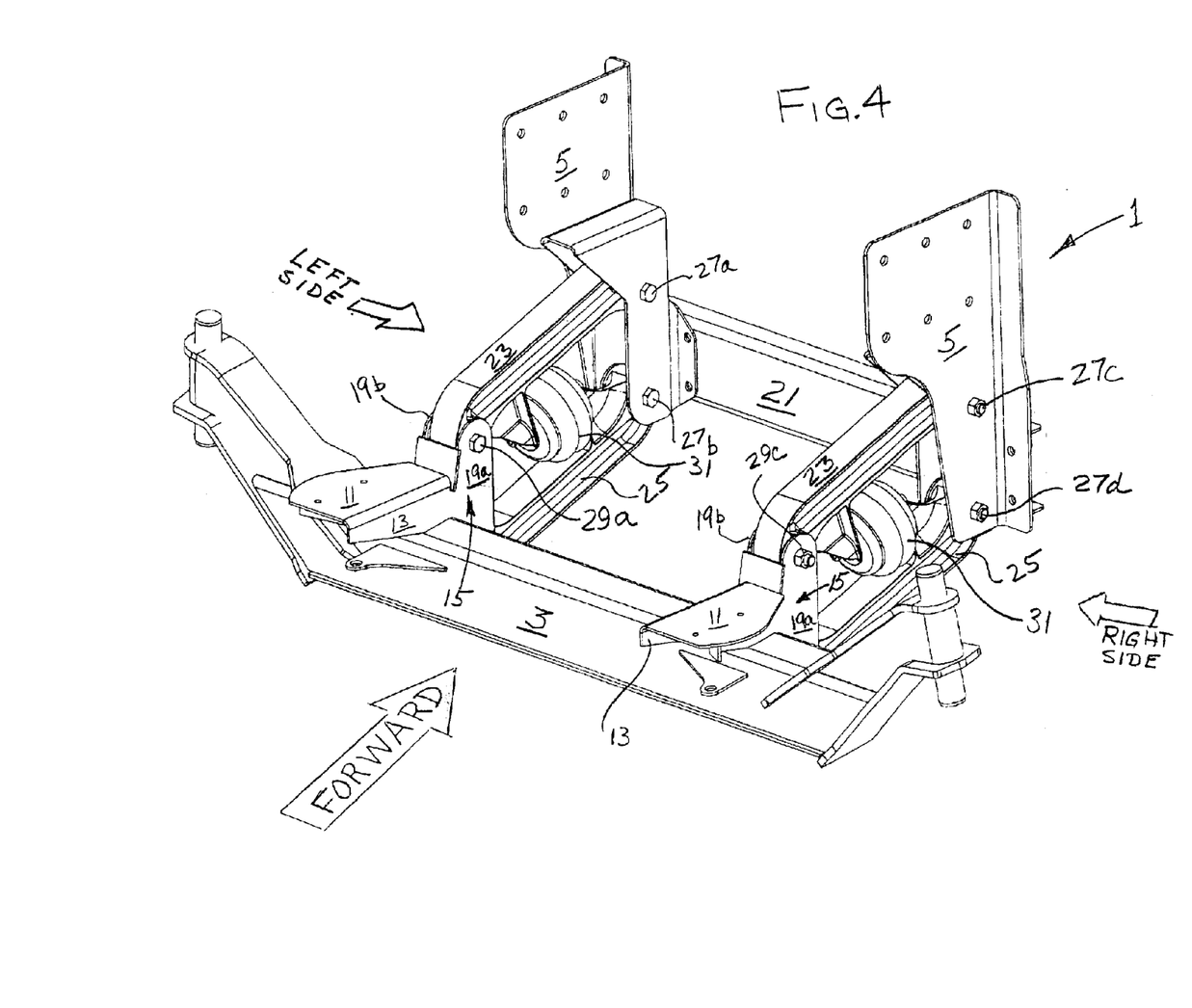
FIG. 4 is a three dimensional forward looking view of the embodiment of FIG. 3, again without the ride bellows installed.

Ride bellows 7 can be any known type of expandable and contractible air bellows or equivalent, lobed or convoluted (as shown). Here convoluted bellows 7 is provided with top and bottom end plates 9a and 9b, respectively. Top plate 9a is attached in conventional fashion to frame member 63 (which is either the longitudinal frame rail of the vehicle or an equivalent frame structure thereof). Bottom plate 9b is then attached to plate 11 of ride bellows platform 13.

Ride bellows platform 13 and plate 11 are, in this embodiment, an integral part of an overall axle connection member 15. In other embodiments, they may be separate structures. Axle connection members 15, as illustrated, each includes a substantially horizontal portion of which platform 13 is a part, and a forward substantially vertical portion formed of opposing, spaced walls 19a and 19b. This vertical structure in this embodiment is an integral part of member 15, but may also be a separate structure. Axle 3, which may be of any conventional design (here shown as a conventional box-type drop axle), is then attached to axle connecting members 15 as by welding, bolting, or other conventional techniques known in the art. Axle 3 extends across the vehicle and has its ends conventional means for retaining wheels (single or dual) thereon. Axle 3, in this respect, may be either a steerable or a non-steerable axle, each type being conventional in the art. Also, optionally provided for increased rigidity and stability, if desired, is cross-member 21 attached to the lower portion of each opposing hanger bracket 5. Cross-member 21 is not employed, of course, in any vehicle in which its underbody componentry does not permit its use. Cross-member 21 simply serves as an optional member for increased rigidity where such is desired and may be accommodated.

Extending between each axle connection member 15 and its respective hanger bracket 5 on each side of the vehicle is an upper control arm 23 and lower control arm 25. Each pair of control arms 23 and 25 are pivotally (and preferably resiliently, by providing the pivot with a conventional resilient bushing pivot member) attached at their forward ends to their respective hanger bracket 5 via pivots 27a, b, and 27c, d, respectively. Control arms 23 and 25 are then pivotally connected at their opposite, rearward ends to and between respective opposing plate walls 19a, b of axle connection member 15 by resiliently bushed pivots (of known type) 29a, b and 29c, d.

Located between each respective upper control arm 23 and its corresponding lower control arm 25 on each side of the suspension is lift bellows 31 (or an equivalent expandable/contractible mechanism). Each lift bellows 31 is comprised of a convoluted (or other conventional) expandable rubber middle portion 33 and opposing end plates 35 and 37 (see FIGS. 5–6). Each forward end plate 37 is connected to its respective lower control arm 25 by a forward bracket 39. Each rearward end plate 35 is connected to its respective upper control arm 23 by a rearward bracket 41. In this respect, brackets 39 and 41 are provided with plates 43 and 45, respectively. End plate 37 is attached to plate 43 and end plate is attached to plate 45. Since end plates 35 and 37 are flush mounted to plates 45 and 43, respectively, the angular orientation between a respective pair of opposing end plates 35 and 37 is established by the angular relationship between a pair of opposing plates 43 and 45.

In the preferred embodiments of this invention, the angular orientation between each pair of end plates 35 and 37 is such that the two plates are, within manufacturing tolerances, substantially parallel to each other, i.e., the angle is less than 1° or essentially zero. However, it is contemplated herein that this angle may be varied up to no more than about 8°, preferably less than about 3° and as aforesaid less than 1° or stated another way, essentially zero. The most efficient orientation, as well as the least stressful on the expandable rubber portion of lift bellows 31 is when the end plates are, within reasonable manufacturing tolerances, essentially zero, i.e., parallel.

The expansion and contraction of both ride air bellows 7 and lift bellows 31 can be effected by any technique well-known and conventional in the art. In this respect, the air mechanism (piping, controls, etc.) for lowering and raising the suspension system by selectively inflating and deflating the air bellows is well-known and conventional in the art. Such generally comprises an air control system connected to the air compressor of the vehicle's air brake system coupled by appropriate valving to manual controls which are conveniently located on the vehicle (e.g., on the side of or in the cab of the vehicle) for selectively operating the suspension. If the vehicle does not have an air brake system, a standard air compressor may be added with conventional piping and valves to supply the needed pressurized air.

Figure 5:
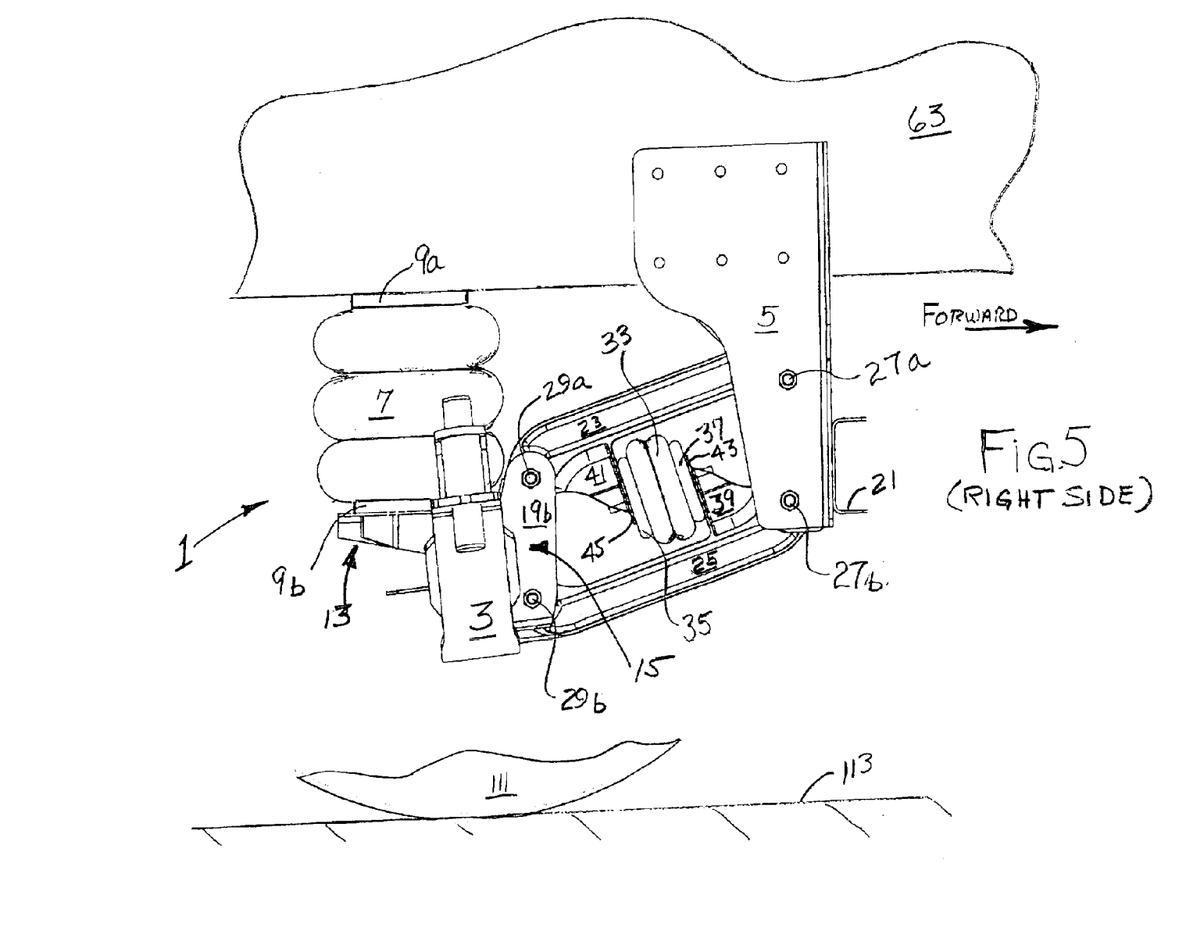
FIG. 5 is a partial, right side plan view of the suspension of FIG. 3 (with its ride bellows installed) in its "lowered" position such that the wheels of the suspension are in full, load bearing engagement with the road surface.
Figure 6:
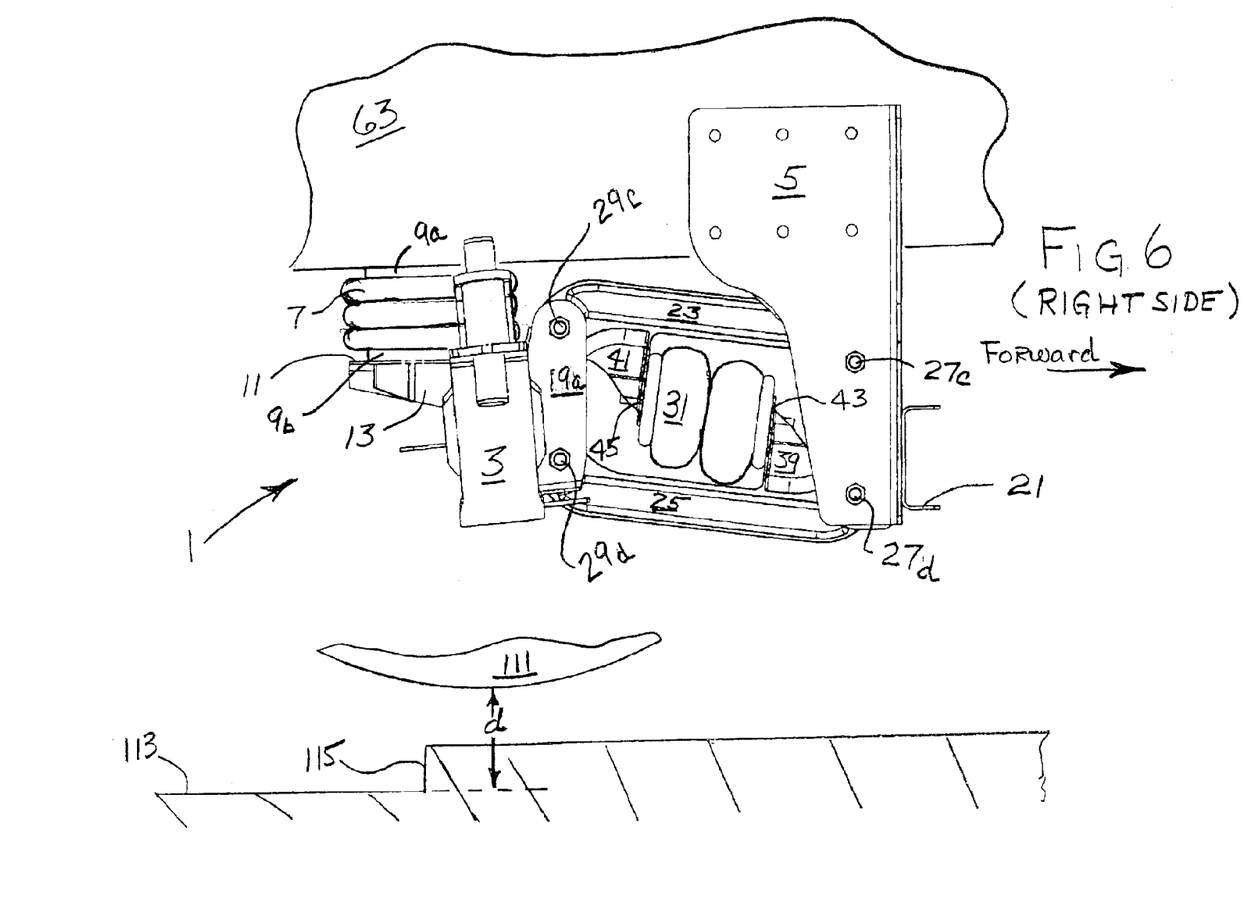
FIG. 6 is a partial, right side plan view of the suspension of FIG. 3 (with its ride bellows installed) in its "raised" position such that the wheels of the suspension are lifted a sufficient distance "d" from the road surface so as to avoid a road surface impediment (e.g., a curb as illustrated).

With particular reference now to FIGS. 5 and 6, the lifting and lowering operation may be illustratively demonstrated. As can be seen, it is essentially the same as the operation of lifting and lowering as described in the aforesaid '031 patent. In this respect, when as shown in FIG. 5, ride bellows 7 is inflated (by operation of the aforesaid conventional controls, not shown for convenience), tires (wheels) 111 of lift axle suspension 1 are forced downwardly by the expansion of bellows 7 and evacuation of air from bellows 31 until engagement with road surface 113 is achieved. By setting the pressure at the appropriate, known and conventional level (e.g., 120 psi) suspension 1 assumes its lawful share of the load of the vehicle and provides a cushioned air ride for the vehicle via large air bellows 7.

As illustrated in FIG. 6, when lift suspension 1 is either not needed or must be lifted to avoid a road impediment, such as curb 115, the controls are operated to reverse the process such that ride bellows 7 are exhausted of air while lift bellows 31 are inflated and, thus, expanded here, as in the '031 patent, in the highly advantageous "bi-directionally" (as defined above) manner such that the angular orientation between end plates 35 and 37 does not substantially change throughout the lifting operation as discussed above. This operation raises tires (wheels) 111 a sufficient distance "d" above road bed 113 so as to avoid curb 115 or other road impediment, to save fuel and tire wear, and/or to make cornering easier. It is also to be noted that in this "raised" position lift bellows 31 effectively hold, in a cushioned but firm fashion, wheels (tires) 111 at the distance "d" above the road surface. This minimizes wear on the various resilient bushings in the suspension due to unwanted vibration of the lift suspension when lifted. Moreover, because the opposing ends of the lift bellows 31 are connected, one end to its upper control arm and the opposite end to the lower control arm, "bi-directional" expansion of lift bellows 31, as aforesaid, is achieved even though the lift bellows 31 in this invention have now been realigned [as compared to the alignment in FIG. 1 (PRIOR ART)] with respect to the control arms to which they are attached so that they are no longer an impediment to, nor will they interfere with, other necessary or desirable vehicle componentry (drive shaft, PTO, hydraulic pump, etc.) found on various popular types of trucks and other vehicles which employ lift axle suspension systems.

Figure 7:
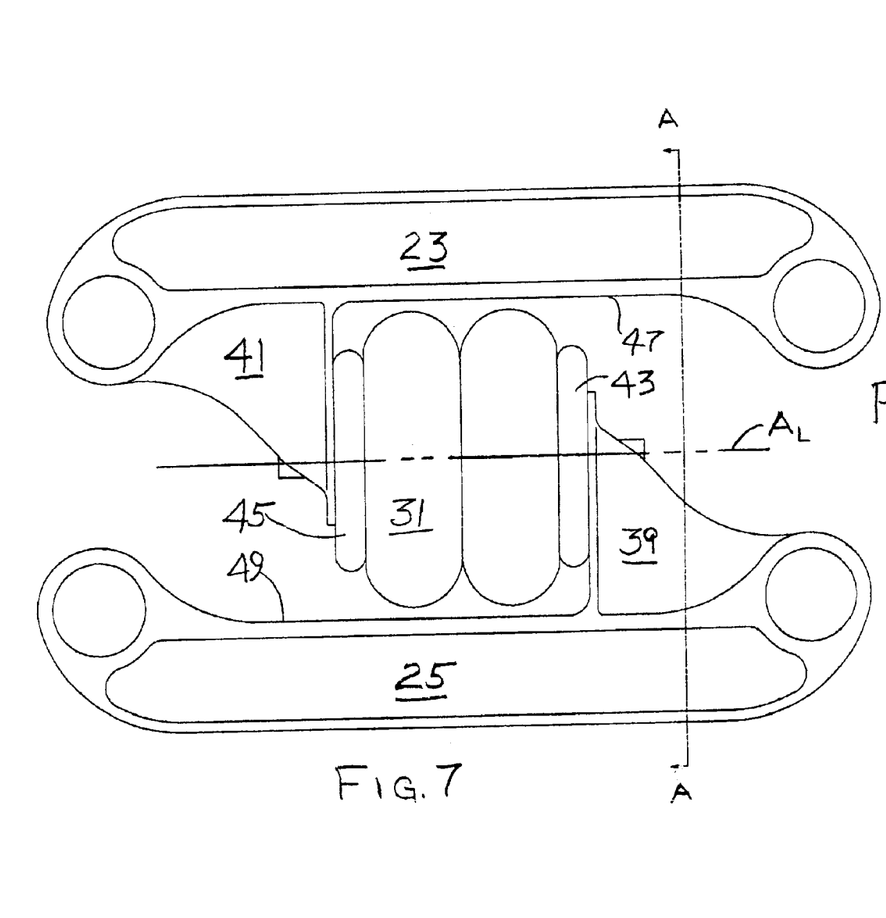
FIG. 7 is a partial side plan view of a pair of either right side or left side (of vehicle) upper and lower control arms having a lift bellows mounted therebetween, according to an embodiment of this invention.
Figure 8:
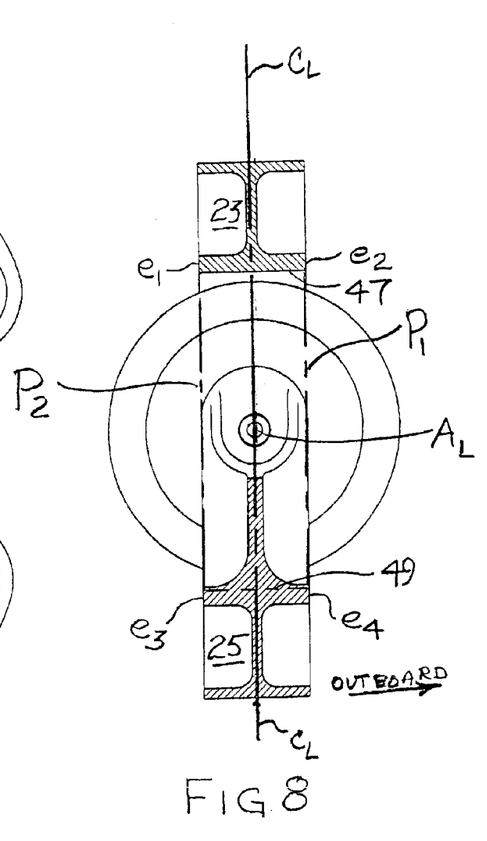
FIG. 8 is a partial sectional view taken along section lines A—A of FIG. 7.

With respect to such improved alignment as contemplated by this invention, reference is now made to FIGS. 7–8. As can be seen, in the preferred embodiments of this invention, upper control arm 23 is aligned with lower control arm 25 such that it is comprised of opposing surfaces 47 and 49, respectively, and an aligned center line $C_L$ which is substantially vertical in the most preferred embodiments of this invention. Opposing surfaces 47 and 49 have longitudinally extending outside edges ($e_1$, $e_2$, $e_3$, $e_4$, such that $e_1$–$e_3$ define a plane $P_2$ extending between them and $e_2$–$e_4$ define a plane $P_1$ extending them and laterally spaced from plane $P_2$ to define a given space therebetween. The planes $P_1$ and $P_2$ are shown in segmented line form in FIG. 8. In this respect, it is to be noted that this alignment of upper control arm 23 with lower control arm 25 need not be vertical, but may be offset somewhat from the vertical. Longitudinal center line $C_L$ of each of the control arms, may also be offset and not be in vertical line with each other. However, in the most preferred embodiments, a substantially vertical alignment of $P_1$, $P_2$ and $C_L$, within manufacturing tolerances, is achieved. Moreover, in such preferred embodiments, the center line of forward bracket 39 and rearward bracket 41 are also preferably aligned with $C_L$ of the control arms 23/25 to within manufacturing tolerances.

Central longitudinal axis $A_L$ of lift bellows 31 is then located between planes $P_1$ and $P_2$ to thereby increase the available envelope into which the suspension may now be fit without impeding or interfering with other vehicle componentry. Moreover, in certain embodiments of this invention, end plates 35 and 37 of lift bellows 31, as well as the general cross-sectional configuration of bellows 31, share a common central longitudinal axis $A_L$ (as shown in FIGS. 7 and 8). In such preferred embodiments, in their most preferred form, axis $A_L$ (see FIG. 8) is aligned, within manufacturing tolerances, with center line $C_L$. However, it is understood that lift bellows 31 may also be located so that $A_L$ is somewhat either inboard or outboard of center line $C_L$. In addition, while axis $A_L$ may abut either plane $P_1$ or $P_2$, going any significant distance beyond $P_1$ or $P_2$, unless control arms 23 and/or 25 are very thin in their lateral width could, if inboard of $P_2$ create interference problems or if outboard $P_1$ as well as inboard of $P_2$, may expose lift bellows 31 to an undue risk of damage from projected road debris during vehicle travel or other use that would not otherwise occur due to the protection afforded by control arm 25. Still further, in the preferred embodiment of this invention, at least the majority portion of and, most preferably, the entire portion of brackets 39 and 41 are also located in the space between planes $P_1$ and $P_2$.

Finally, it is to be noted that the preferred embodiments of this invention are of a truly parallelogram configuration as this term is used in the art. As illustrated, for example, in FIGS. 3–6 upper and lower control arms 23 and 25 are substantially parallel (in side view) to one another, both in an individual pair and most preferably as to all four of them in the suspension. However, variations in this is true (within dimensional tolerances), parallelogram three dimensional box-like configuration are tolerable at times. Perfect parallelism is not truly necessary, but is preferred.

Once given the above disclosure, many other features, modifications, and improvements will become apparent to the skilled artisan. Such other features, modifications, and improvements are, therefore, considered to be a part of this invention, the scope of which is to be determined by the following claims.

We claim:

1. A lift axle suspension system comprising:
    a) an upper and a lower control arm, each arm having a first end and a second end;
    b) a frame bracket member located at the first end of each said control arm;
    c) pivot means connecting the first ends of said control arms to a respective frame bracket member;
    d) an axle connecting member for connecting an axle to said suspension;
    e) pivot means connecting the second ends of said control arms to said axle connecting member;
    f) each said upper and lower control arm having an inboard edge and an outboard edge thereby defining between said respective opposing edges of said upper and lower control arms an inboard plane and an outboard plane and a space between said inboard plane and said outboard plane; and
    g) an expandable and retractable lift bellows having a first end connected to one of said control arms and a second end connected to the other of said control arms and having a longitudinal axis located within said space between said inboard plane and said outboard plane.

2. A lift axle suspension system according to claim 1, wherein said inboard plane and said outboard plane are substantially vertical planes.

3. A lift axle suspension system according to claim 1, wherein said suspension further includes a ride bellows so located that when said lift bellows is deflated and said ride bellows is expanded, the suspension is lowered into road engagement.

4. A lift axle suspension system according to claim 1, wherein said upper control arm includes a lower surface and said lower control arm includes an upper surface spaced below said lower surface of said upper control arm and wherein said first end of said lift bellows is attached to said upper surface of said lower control arm by an upper bracket member and the other end of said lift bellows is attached to said lower surfaces of said upper control arm by a lower bracket member, said upper bracket member being comprised of a plate member and said lower bracket member being comprised of a plate member spaced from and opposing said plate member of said upper bracket member and wherein said lift bellows is located between said spaced plate members and is connected thereto.

5. A lift axle suspension system according to claim 4, wherein a majority portion of each of said bracket members is located with said space between said inboard and outboard planes.

6. A lift axle suspensions system according to claim 5, wherein each of said bracket members is located substantially entirely within said space between said inboard and outboard planes.

7. A lift axle suspension system according to claim 5, wherein each said upper and lower control arm has a longitudinal center line thereby defining a center line plane between said upper control arm and said lower pair control arm; wherein said lift bellows located between said control arms has a longitudinal axis; and wherein said lift bellows is so located that its said longitudinal axis is located proximal said center line plane of said control arms to which it is attached.

8. A lift axle suspension system according to claim 7, wherein said lift bellows is so located that its said longitudinal axis is located in said center line plane of said control arms to which it is attached.

9. A lift axle suspension system according to claim 1, wherein said lift bellows are so located and connected such that expansion of said lift bellows is bi-directional.

10. A lift axle suspension system according to claim 7, wherein said lift bellows are so located and connected such that expansion of said lift bellows is bi-directional.

11. A lift axle suspension system according to claim 1, 4, 8 or 9, which further includes an axle having a first end, a second end and a wheel located at each of said first end and said second end.

12. A wheeled vehicle comprising a frame member on each side of said vehicle, at least two non-liftable axle and wheel bearing suspension systems as the primary means of road engaging support, and as a lift axle suspension system, the lift axle suspension system of claim 1, 4, 8 or 9, wherein said lift axle suspension system is connected to each said frame member by a respective said frame bracket member, said suspension further including a wheel-bearing axle connected to said axle connecting member, said axle extending laterally across said vehicle.

* * * * *